United States Patent [19]

Hendrickson

[11] 4,001,504
[45] Jan. 4, 1977

[54] AUTOMATIC TERMINAL DATA RATE SELECTION

[75] Inventor: Thomas Allen Hendrickson, Poughkeepsie, N.Y.

[73] Assignee: International Business Machines Corporation, Armonk, N.Y.

[22] Filed: June 9, 1975

[21] Appl. No.: 585,001

[52] U.S. Cl. .............................. 178/68; 178/69 M; 178/69.1

[51] Int. Cl.² ..................................... H04L 15/00

[58] Field of Search ........ 178/53.1, 2 D, 68, 69 M, 178/69.5 R, 69.5 G; 179/15 BS

[56] References Cited
UNITED STATES PATENTS

| | | | |
|---|---|---|---|
| 3,657,653 | 4/1972 | Wilkinson | 178/68 |
| 3,699,255 | 10/1972 | Wallace, Jr. | 178/69 M |
| 3,702,900 | 11/1972 | Sturzinger | 178/53.1 R |
| 3,705,315 | 12/1972 | Clark | 178/69.5 R |
| 3,730,998 | 5/1973 | Schmidt et al. | 178/69.5 R |
| 3,766,316 | 10/1973 | Hoffman et al. | 178/69.5 R |
| 3,838,221 | 9/1974 | Schmidt et al. | 179/15 BS |

*Primary Examiner*—Marshall M. Curtis
*Attorney, Agent, or Firm*—Robert Lieber

[57] ABSTRACT

In a digital data transmission system, a unique character marks the beginning of a data message. The speed at which that character is transmitted is sensed and the receiver speed set accordingly through the provision of a counter to count successive one-state bits in a constant speed dibit carrier for the unique character. A decoder responds to particular dibit counts to set speed latches corresponding to the speed at which the character was transmitted.

5 Claims, 8 Drawing Figures

FIG. 7

| BITS/SEC | F BYTE | "0" DIBITS | "1" DIBITS | "0" DIBITS | "1" DIBITS | "0" DIBITS | "1" DIBITS | "0" DIBITS | "1" DIBITS | "0" DIBITS | "1" DIBITS | "1" STATE DIBIT COUNT |
|---|---|---|---|---|---|---|---|---|---|---|---|---|
| 9600 | | 0 | | 0 | | 0 | | 0 | | 0 | | |
| 4800 | | | 1 | | 1 | | 1 | | 1 | | 1 | 6 |
| 2400 | | 0 | | 0 | | 0 | | 0 | | 0 | | |
| 1200 | | | 2 | 2 | 2 | 2 | 2 | 2 | | 1 | | 13 |
| 600 | | 3 | 4 | 4 | 4 | 4 | 4 | | | | | 27 |
| | | | 8 | 8 | 8 | 8 | 8 | | | | | 55 |
| | | 7 | | | | | | | | | | |
| | | | 16 | 16 | 16 | 16 | 16 | | | | | 111 |
| | | 15 | | | | | | 15 | | | | |

"1" DIBIT COUNT

AUTOMATIC TERMINAL DATA RATE SELECTION

This invention relates to digital data transmission systems and more particularly to the synchronization of receiver circuits to one of several speeds of data transmission.

BACKGROUND OF THE INVENTION

Data transmission systems are typically characterized by lines which extend from a transmitting station to receiving terminals. The lines may be in the form of a loop in which the transmission is always in the same direction, called a simplex loop, or they may be in a more complex loop or not in a loop at all, such as terminals which are connected over telephone lines. Whatever the form of connection between terminals it is desirable to have the capability of transmitting data messages at more than one speed; high speeds for purposes of throughput and lower speeds to provide the means to drop down in an attempt to eliminate faulty transmissions where for noise or some other reason received data does not correspond to the transmitted data. It is also desirable to have a plurality of speed choices in systems which do not normally operate over telephone lines but which can use telephone lines as a back up capability when the primary controller is not in operation. Since systems which are independent of telephone lines can be made to operate at speeds in excess of those available on telephone lines, it is necessary to have the capability of operating at different speeds in order to make use of such a back up system.

It is, therefore, the general object of this invention to provide the capability of changing speeds at each receiving terminal through automatic means to avoid the necessity of manually changing speeds whenever the data transmission rate changes.

SUMMARY OF THE INVENTION

Receiving terminals are made to automatically respond to the rate of data transmission through the reception of a unique character which automatically sets the speed of the terminal to receive the following data transmission at the proper speed. In the preferred embodiment the unique character is in every data message and preceeds that data message in order for the system to adjust properly. To implement the invention, the terminal includes means for sensing the unique character, the rate at which it is being transmitted and latches to set the speed of the terminal in synchronization with the transmission.

BRIEF DESCRIPTION OF THE DRAWINGS

The foregoing and other objects, features and advantages of the invention will be apparent from the following detailed description of a preferred embodiment of the invention as illustrated in the accompanying drawings wherein:

FIG. 7 is a tabulation of one-state dibit counts in the flag byte for various speeds.

DESCRIPTION OF AN EMBODIMENT

Figure 1:
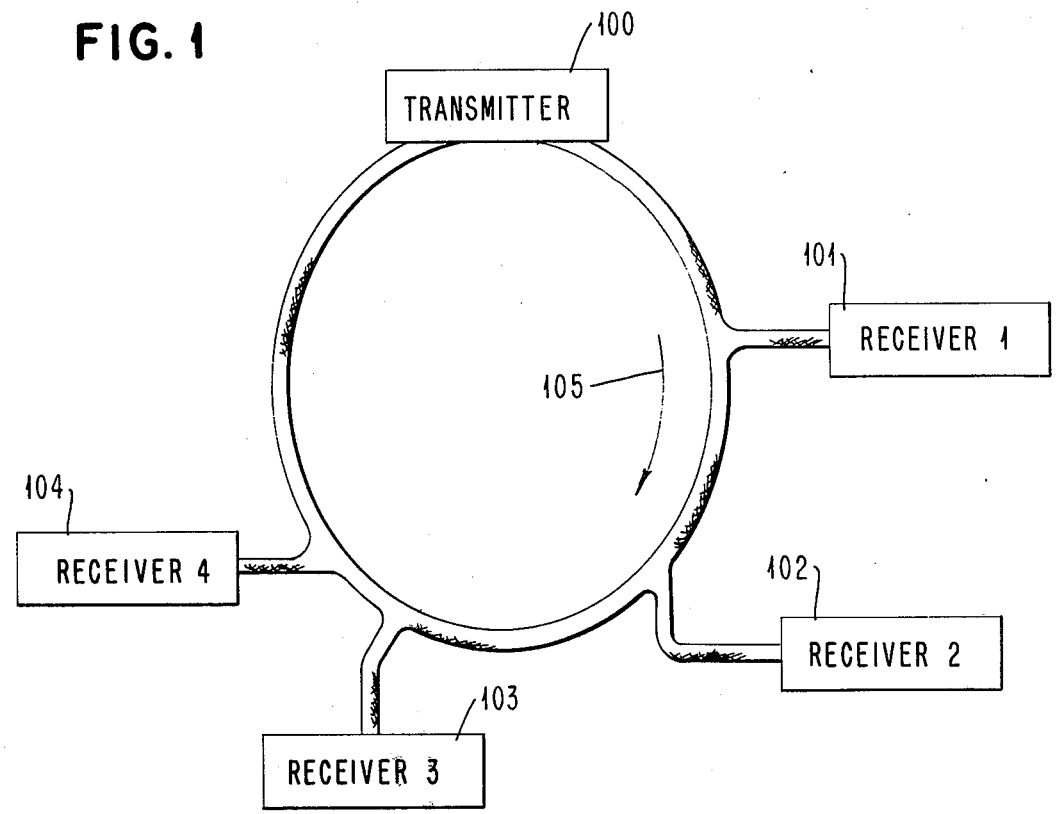
FIG. 1 is a representation of a simplex loop data transmission system.

FIG. 1 shows a diagram of the loop system in which the invention might be used. A transmitter 100 is shown connected to transmit data in a single direction around the cable loop as shown by the arrow 105. Receiving terminals are shown connected to the loop at 101, 102, 103 and 104. Typically in such a loop the receivers may also be transmitters and transmit messages either to another terminal or back to the controlling terminal 100 according to the design of the transmission system.

Figure 2:
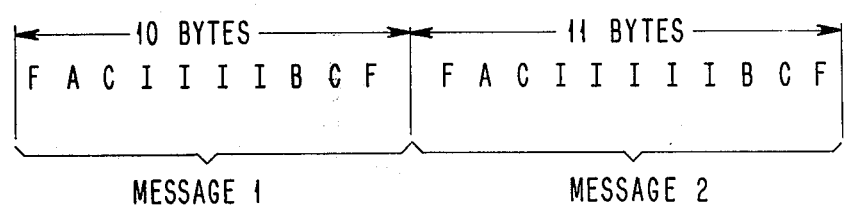
FIG. 2 shows a typical format of a message in a transmission system such as shown in FIG. 1.

FIG. 2 shows that a typical message format might be in a system such as shown in FIG. 1. In FIG. 2 note that message 1 is comprised of a flag byte (F), an address byte (A), a control byte (C), four information bytes (I), two block check bytes (BC) and a flag byte (F). Message 2 has the same format except that five information bytes have been transmitted in place of four. Usually systems of the type shown in FIG. 1 will have the capability of transmitting any number of information bytes in a message from 1 to 256 or more. For purposes of this invention, the important feature to note concerning this type of message format is that the message begins and ends with the flag byte (F). Such a signal provides a unique character which always signals the beginning or the end of a message and cannot be confused by the receiving terminal with data.

Figure 3:
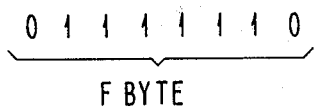
FIG. 3 shows a unique bit pattern for a flag byte to be used in the message format.

In order to devise a system of transmission which contains unique characters it is necessary to isolate certain bit patterns which are apart from what is permissible in a data byte. Thus, a flat byte might, for example, be comprised of a zero state bit followed by six consecutive one state bits followed by a zero state bit. Such a flag would place a constraint upon data transmission in that it could not contain any more than five consecutive one state bits to be a valid data message. An F byte of the form just described is shown in FIG. 3.

Figure 4:
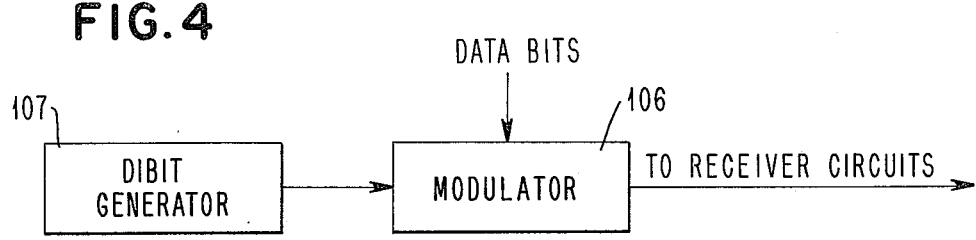
FIG. 4 is a block diagram of the transmitter.

FIG. 4 is a block diagram of the transmitter in a system such as shown in FIG. 1. Data input bits are shown entering a modulator 106 which also receives a "carrier" signal generated from dibit signal generator 107. The modulated dibit signal is then sent over the communication system to receiver circuits for display or other uses at the receiver terminal. Since digital reception requires the recognition of only two states, the one state and the zero state, the dibit generated at 107 can be modulated at 106 in such a manner that a phase reversal occurs upon the reception of the zero data bit but no phase reversal occurs upon the reception of a one state data bit. This type of modulation is shown in FIG. 5.

Figure 5:
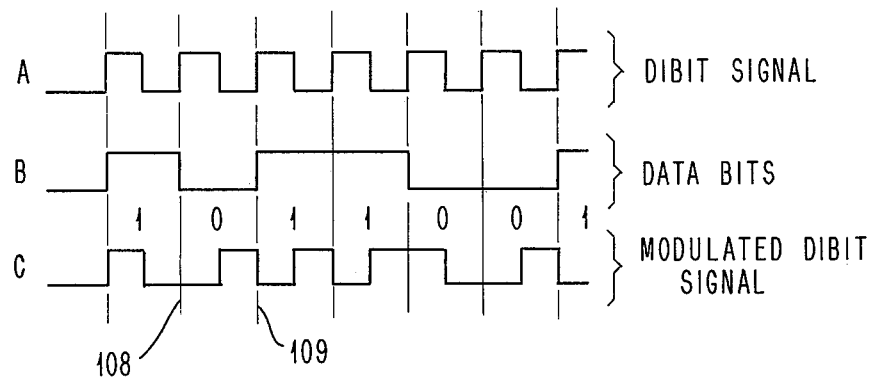
FIG. 5 shows the modulated dibit signal produced as an output from FIG. 4 components.

FIG. 5 at line A shows that the basic dibit signal generated at 107 in FIG. 4 is a recurring square wave pattern. A data bit stream at line B comprised of one, zero, one, one, zero, zero, one is shown as a modulating input with the resulting modulated dibit signal shown on line C. Note that a phase reversal occurs for the dibit signal whenever a zero state data input is sensed such as at 108 while no phase reversal occurs when a one state bit is sensed such as at 109.

Figure 6:
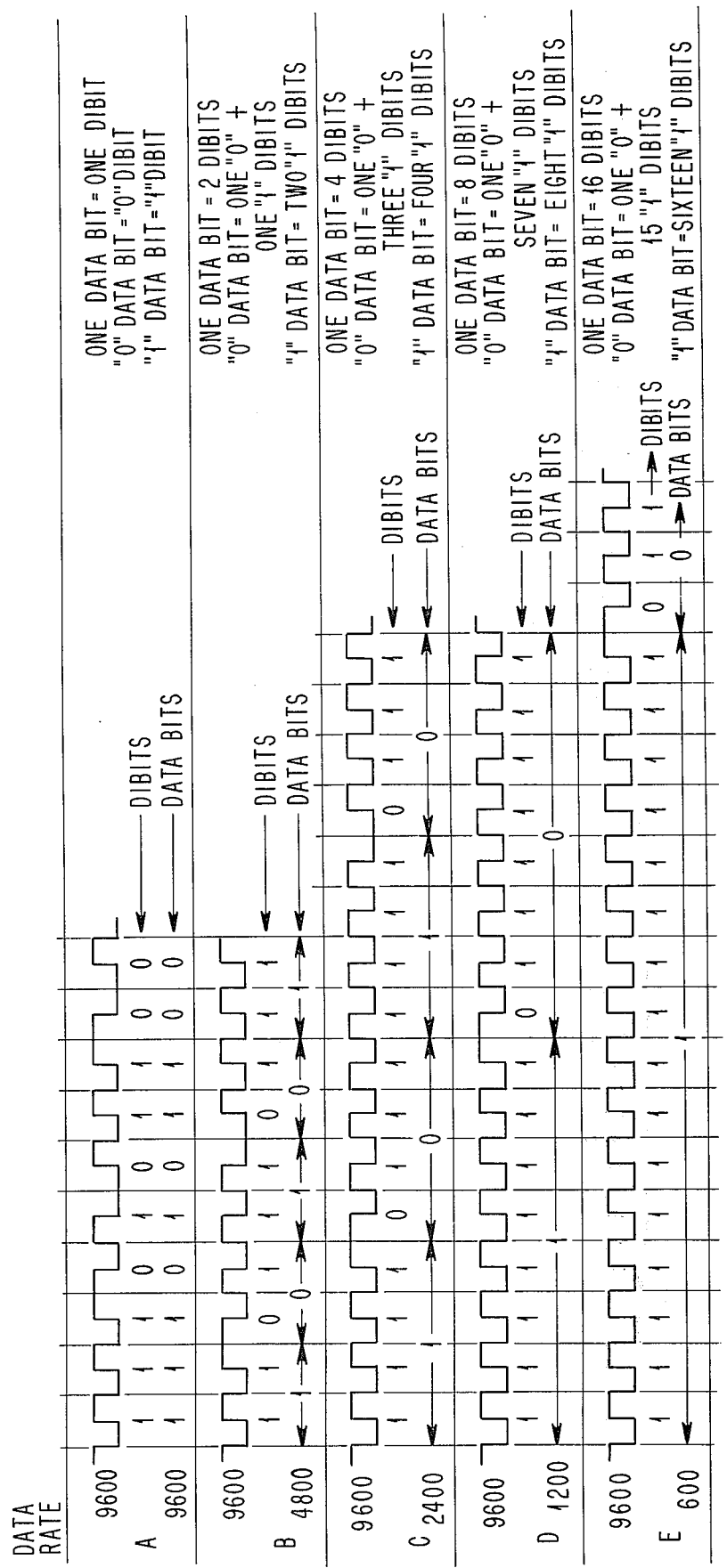
FIG. 6 shows data bit/dibit relationships at various data bit speeds.

In a preferred embodiment of a receiving terminal, the terminal is enabled to operate at five different speeds, 9600 bits per second, 4800 bits per second, 2400 bits per second, 1200 bits per second and 600 bits per second. FIG. 6 shows the data bit/dibit relationship for these various speeds. The dibit signal remains constant at 9600 bits per second but the speed at which data is being received varies according to the speed which has been selected at the transmitter. In FIG. 6, line A, where the data bit rate is at 9600 bits per second, one data bit duration equals one dibit duration. This was also the example shown in FIG. 5. In line B where the data rate is 4800 bits per second, one data bit duration is equal to two dibits. Consequently, a one state data bit is seen in the modulated dibit stream as two successive dibits while a zero bit is seen in the modulated dibit stream as a phase reversed dibit, that is, a zero dibit followed by a one dibit, that is, non-phase reversed dibit. In line C a speed of 2400 bits per second is shown where one data bit duration is equal to four dibits. At this speed, a one state data bit is seen in the modulated dibit stream as four one dibits while a zero data bit is seen as one zero dibit plus three one dibits. In line D a data rate of 1200 bits per second is shown where eight dibits occur for every one data bit. In this instance a one state data bit will be mirrored in the modulated dibit stream by eight one dibits while a zero bit will be mirrored in the modulated dibit stream by one zero dibit plus seven one dibits. At the speed of 600 bits per second shown in line E, 16 dibits will be generated during the reception of each data bit. In this case, 16 one dibits mirror one one state data bit while a zero data bit is mirrored by one zero dibit plus 15 one state dibits.

It is thus apparent that if the unique flag byte shown in FIG. 3 to consist of six consecutive one state bits is to be truly unique, the receiver must have the capability of "understanding" at which speed it is operating. FIG. 6 shows that six consecutive one state dibits would indicate six consecutive one state data bits at 9600 bits per second and thus indicate the flag byte F whereas six consecutive dibits at a speed of 4800 bits per second would indicate only three one state data bits and would not be a flag byte. Similarly, six consecutive dibits at a speed of 2400 data bits per second would be the signal of one one state data bit and the beginning of another one state data bit. At speeds of 600 or 1200 bits per second, six consecutive dibits are only a part of one data bit.

FIG. 7 is a chart of the tabulation of dibit counts in the flag byte at various speeds. For example, at 9600 bits per second, there are six one state dibits between zero dibits while at 4800 bits per second there are 13 one state dibits between zero dibits. FIG. 7 shows 27 one state dibits between zero dibits at 2400 bits per second, 55 dibits at 1200 bits per second and 111 dibits at 600 bits per second. Thus, definite numbers of dibit counts signify the various speeds at which the flag byte is being transmitted. Therefore, by counting the number of consecutive one state dibits in the flag byte it is possible to determine at what speed a message is being transmitted.

Figure 8:
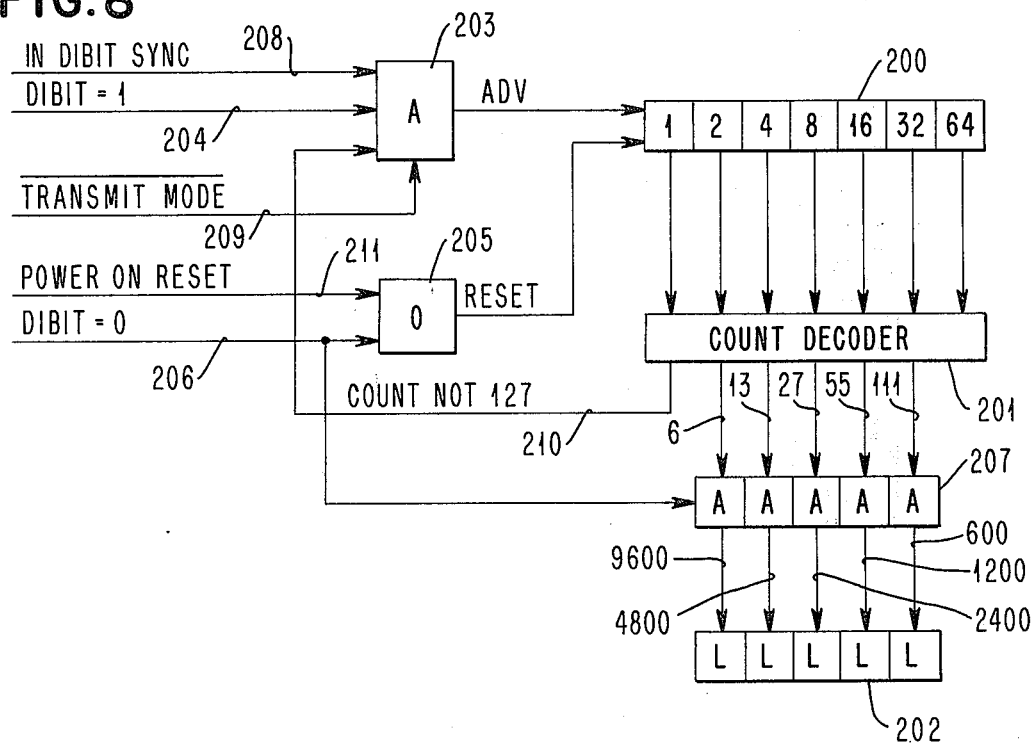
FIG. 8 is a circuit diagram for counting dibits and setting the speed of the receiver.

FIG. 8 shows the circuits necessary for an implementation of the invention. Basically, the circuit is simply comprised of a dibit counter 200, a count decoder 201 and a set of speed select latches 202. An input AND gate 203 provides the input to the dibit counter. The basic input is the "dibit equals one" line 204 which, when raised, signals a one state dibit for adding to the count in counter 200. Each time a zero state dibit is received over line 206. A reset circuit is triggered in counter 200 through OR gate 205. Hence, the counter is advanced by each one state dibit and reset to zero by each zero state dibit. FIG. 8 shows that when a count of six is accumulated in the counter 200 at the time a zero state dibit is encountered, the count decoder at 201 registers the six through AND gates 207 which sets the speed select latch 202 corresponding to a data bit rate of 9600 bits per second. If the count in dibit counter 200 had reached 13 at the time a zero state dibit was encountered, AND gates 207 would provide the setting of speed select latch 202 to register a 4800 bit per second rate. Similarly, if the reset at counter 200 was encountered after 27 dibits counted, decoder 201 would provide a signal through gates 207 to set a latch for 2400 bits per second. If the count in counter 200 had reached 55 the zero dibit reset would enable an AND gate at 207 to set a speed select latch for 1200 bits per second. Finally, if the count in counter 200 had reached 111, the speed select latch corresponding to 600 bits per second would be set.

FIG. 8 shows various other inputs to AND gate 203. One of these is the "in-dibit sync" line 208 which is simply a check line to insure that the generated dibit signal is in an appropriate phase and shape. The line 209 indicates "not transmit mode" which is simply another manner of saying that the terminal is in receiving mode. The last input to AND gate 203 is line 210 which when raised, states that the count is not 127, which, of course, is the maximum count in dibit counter 200. The purpose of this line is that once the count reaches 127 the dibit counter would then begin over again at zero and should a count of six be reached at the time the next zero state dibit was received, an erroneous indication would then be made as to bit speed. Consequently, once a count in excess of 111, such as 127, has been reached, the counter circuit would be disabled by line 210. Line 211 is simply a power on reset line for resetting the counter at initial operation.

Thus, it may be seen that speed select latches 202 correspond to select switches which might be set at different speeds manually by an operator at a terminal. Therefore, an automatic means for setting the speed has been provided through the flag bit and the circuits shown in FIG. 8.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a variable-speed data transmission system wherein a primary terminal transmits digital data messages to receiving terminals at one of a plurality of discrete digit-transmission speeds in a set of uniquely related speed, each said message containing a control character interspersed with other information signals, said character having a unique digital signal composition which is different at each said speed and distinguishable at each said speed from compositions of all other signals utilized in said system at any of said speeds, the improvement comprising first means incorporated within a said receiving terminal for detecting said unique control character by detecting one of said unique signal compositions thereof, and second means for responding to said detected one of said unique signal compositions to set the digit-reception speed of said receiving terminal, whereby said receiving terminal is automatically selfadjusted to recognize the speed at which the digits of said data messages are being transmitted and thereby adjusted to intelligibly receive said digits.

2. The system of claim 1 wherein said messages are comprised of repeating elemental signals recurrent at a constant speed uniquely related to each speed in said set, each digit of said message comprising at least one cycle of recurrence of said elemental signals, and wherein said first means is comprised of means including a counter connected to receive and count consecutive recurrences of said elemental signals in unchanged form for detecting said unique control character compositions and wherein said second means is comprised of decoding means connected to said counter for recognizing particular counts uniquely indicative of respective said unique control character compositions associated with respective ones of said speeds, and speed select means connected to said decoding means for adjusting the speed at which said receiving terminal operates to relate incoming said elemental signals to information digits of said messages.

3. The system of claim 2 wherein said elemental signals are comprised of repeating dibit signals recurrent at a constant speed which is an integer multiple of each speed in said set, said dibit signals manifesting one value of binary message information by recurrences in unchanging form and manifesting the complement of said one value by unchanging recurrences in an altered form relative to an immediately preceding manifestation wherein, said counter counts the number of consecutive recurrences of said dibit signals in unchanged form between successive transitional changes in the form of said dibit signals, thus obtaining a count of consecutive one-state dibits which at reception of said control character corresponds uniquely to one of said unique compositions and thereby to the digit-transmission speed of said character and message.

4. The system of claim 3 wherein said transitional change in the form of said dibit signals is manifested by a phase shift to which said decoding means responds by setting said digit-reception speed if the count instantly represents one of said unique compositions and by concurrently resetting said counter.

5. The system of claim 3 wherein said decoding means is responsive to a maximum count in said counter, which effectively represents an error, to inhibit further operation of said counter and thereby prevent resetting of said counter by an overflow count and further accumulation of erroneous counts in said counter which would be capable of provoking an erroneous speed adjustment.

* * * * *